March 15, 1966     R. B. CALDWELL     3,240,467
SELF-ALIGNING PIVOTED VALVE
Filed July 2, 1963

INVENTOR.
ROLAND B. CALDWELL
BY
ATTORNEY

United States Patent Office 3,240,467
Patented Mar. 15, 1966

3,240,467
SELF-ALIGNING PIVOTED VALVE
Roland B. Caldwell, Worthington, Ohio, assignor to Ranco Incorporated, Columbus, Ohio, a corporation of Ohio
Filed July 2, 1963, Ser. No. 292,257
1 Claim. (Cl. 251—87)

This invention relates generally to fluid flow control valves, and more particularly to valves of the type utilizing a blade or plate type valve member which is mounted for swinging movement in its own plane into and out of registration with a valve seat or port for controlling fluid therethrough.

Valves of this type find particular utility in controlling the flow of water or other liquid coolant of an automobile engine or the like through a heater or radiator in the passenger compartment. Such valves have generally utilized an annular resilient rubber seal around the valve seat or flow port to be controlled, and a valve blade rigidly fixed to an adjusting shaft which is offset to one side of the flow port, and have required sufficient interference between the rubber seal and the valve blade to prevent leakage when the latter is in its port closing position. The amount of interference necessitated between the rubber seal and the blade has resulted in rapid and excessive wear of the seal and, because the blade is rigidly fixed at only one end to its adjusting shaft, has resulted in a cocking action of the blade and ineffective sealing and leaking of the valve, particularly at low pressures. In addition, the interference between the seal and the valve blade requires a high level of adjustment effort, a situation which is particularly unsatisfactory in applications where the valve is manually operated by the familiar Bowden wire or choke cable.

With the foregoing in mind, it is one object of this invention to provide an improved flow control valve having a blade or plate type valve member which is self-aligning with respect to the flow port or valve seat on which it closes whereby wear of the seat, resistance to positional adjustment of the valve member, and leaking due to cocking of the valve member are materially reduced.

It is another object of this invention to provide an improved flow control valve of the foregoing character wherein an adjusting shaft is drivingly connected to the self-aligning valve member to effect rotation thereof into and out of registration with an annular valve seat by means permitting movement of the valve member axially of the shaft toward and away from the valve seat in directions normal to the plane of the valve member, the valve member being urged toward the valve seat by biasing means applying a force to the valve member at a point overlying the center of the annular valve seat when the valve member is in registration therewith, whereby the valve member is free to position itself in good sealing engagement against the valve seat.

Yet another object of this invention is the provision of such a valve wherein the means connecting the valve member to the shaft for rotation therewith is in the form of a spring member which also provides the biasing force urging the valve member toward the seat surrounding the outlet port. In a preferred embodiment of the invention, the fluid inlet port is disposed opposite the fluid outlet port, with the valve member swingable therebetween so that when the valve is open there will be a minimum of flow restriction, and when the valve is closed fluid pressure will aid in maintaining an effective seal.

The invention may be said to reside in certain constructions and arrangements of parts providing the foregoing objects and advantages as well as others which will become apparent from the following detailed description of a preferred form of flow control valve embodying the invention read in conjunction with the accompanying sheet of drawings forming a part of this specification, and in which FIG. 1 is a side elevation of a flow control valve embodying the present invention;

Figure 1:
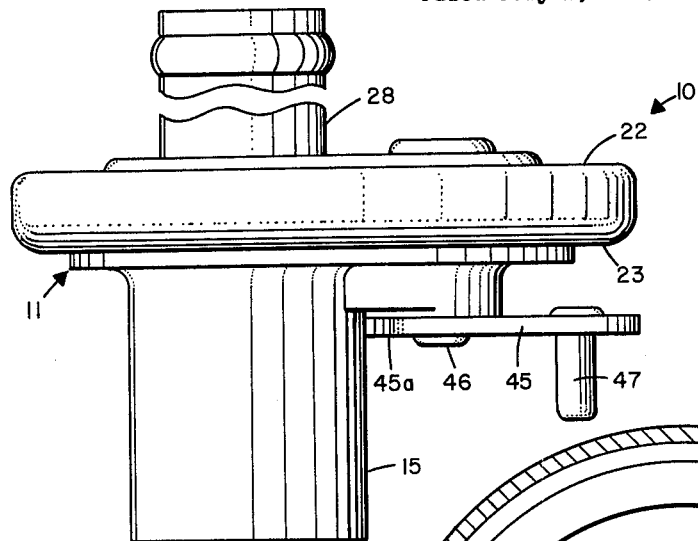
Figure 3:
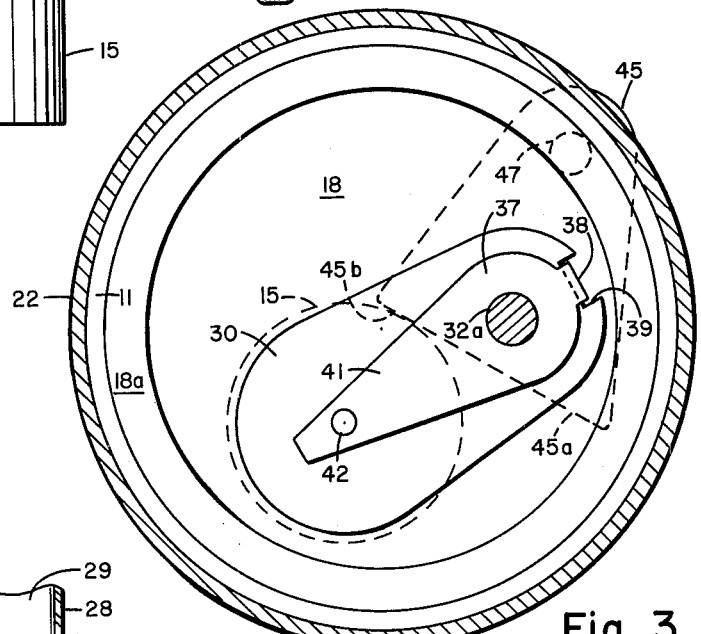
FIG. 3 is a horizontal sectional view taken substantially along line 3—3 of FIG. 2.
Figure 2:
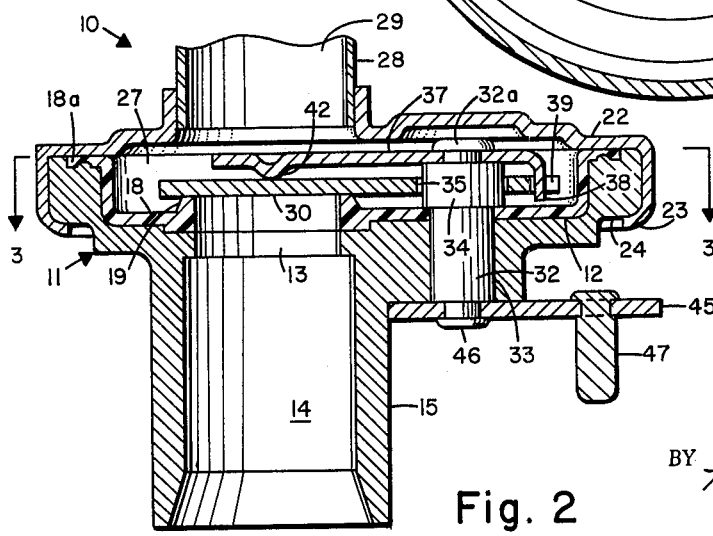
FIG. 2 is a vertical sectional view of the valve of FIG. 1.

In the form of the invention shown in the drawings and described hereinafter, there is provided an improved flow control valve 10 comprising a generally circular valve body 11 which is preferably formed as a metal casting and has a shallow recess 12 defined in one side thereof. The recess 12 communicates through an outlet port 13 with the passage 14 of an outlet connection 15 forming an integral part of the body. The recess 12 is lined with a flexible and resilient sealing member 18, the peripheral edge 18a of which serves as a sealing gasket between the valve body 11 and a generally circular cover member 22.

The cover member 22, which is conveniently formed as a sheet metal stamping, closes off the recess 12 to define a chamber 27, and is secured to the valve body by crimping or forming the peripheral edge 23 of the cover member around a shoulder surface 24 of the valve body. A tubular inlet connection 28 is secured by brazing or the like in an opening in the cover member 22, and defines an inlet passage 29 in alignment with the outlet port 13.

The sealing member 18 is provided with an integrally molded annular valve seat 19 surrounding an opening in the sealing member in registration with the outlet port 13, the annular valve seat projecting slightly into the chamber 27. A plate or blade-like valve member 30 is cooperable with the valve seat 19 to control the flow of fluid, such as the engine cooling liquid of an automotive vehicle, from the inlet passage 29 through the chamber 27 and out of the flow port 13 and outlet passage 14. To this end, the valve member 30 is mounted for swinging movement in its own plane by means of an adjusting shaft 32 which extends through an opening in the sealing member 18 and is rotatably journaled in a suitable bore 33 in the valve body 11. The adjusting shaft 32 has an enlarged end portion 34 which overlies the edge of the sealing member 18 surrounding the bore 33, and is loosely received in an opening 35 in one end of the valve member 30.

Secured to the inner end of the adjusting shaft 32, by staking or riveting as at 32a, is a spring metal member 37 having a downturned end portion 38 engaged in a notch 39 in the valve member 30 so as to effect a rotary driving connection between the adjusting shaft 32 and the valve member while permitting axial movement of the valve member along the enlarged portion 34 of the adjusting shaft. The other end of the spring metal member 37 is in the form of a biasing spring arm 41 having a projection 42 which engages the valve member 30 at a point having a radial distance from the shaft 32 equal to the distance to the center of the outlet port 13 from the adjusting shaft 32. The shaft 32 is rotatable by an adjusting lever 45 to provide swinging movement of the valve member 30 more or less into and out of registration with the outlet port 13. The adjusting lever 45 is securely staked or riveted at 46 to the adjusting shaft and is conveniently provided with a suitable stud or lug 47 for connection with a control cable, not shown. The adjusting lever 45 is preferably provided with lateral extensions 45a and 45b which are engageable with the outer surfaces of the outlet connection 15 to limit rotation of the shaft 32 and the valve plate 30 at the fully open and fully closed positions of the valve member 30.

The surface of the valve member 30 which rides on the valve seat 19 is preferably provided with a thin film or coating (not shown) of a suitable friction reducing substance such as polytetrafluoroethylene, a plastic sold under the trade name of "Teflon." The valve member 30 is free to move axially of the adjusting shaft 32 although it is constrained to rotation therewith by the arm 38 and, because the biasing arm 41 continually urges the valve member toward the seat 19 by application of force centrally of the seat, it will be appreciated that the valve member will seek a level position thereagainst. It will also be appreciated that because of this self-leveling action, an effective seal may be maintained between the valve member and its seat 19 with a minimum biasing force, thereby substantially reducing the effort required to effect adjustment of the position of the valve member and minimizing wear of the resilient material of the seat, and should any such wear occur the valve member will nevertheless be maintained in sealing engagement with the seat.

Although the present invention has been described in considerable detail with reference to a specific flow control valve embodying the invention, it will be understood that the invention is not limited thereto, but rather the invention includes all those modifications, substitutions, and uses as are reasonably embraced by the scope of the claim hereof.

Having described my invention, I claim:

A valve comprising:

(a) means forming a housing including a wall having an outlet port therein, (b) means forming a ridge-like valve seat surrounding said port and projecting above the surface of said wall about the said port, (c) a shaft projecting into said housing and rotatable on its axis, the axis thereof being offset relative to said valve seat and extending normal to the plane of said valve seat, (d) a plate disposed in a plane normal to the axis of said shaft and having an opening loosely receiving said shaft whereby said plate may move axially along said shaft, said shaft forming a pivot for said plate for swinging said plate into and out of registration of said valve seat, (e) a spring arm having one end secured to said shaft and extending alongside and engaging said plate for urging it into engagement with said valve seat when said plate is moved into registration therewith, and (f) means forming a spline connection between said spring arm and plate for forming a driving connection by which rotation of said spring by said shaft rotates said plate.

References Cited by the Examiner

UNITED STATES PATENTS

| | | | |
|---|---|---|---|
| 544,069 | 8/1895 | Pearson | 251—179 |
| 2,202,735 | 5/1940 | Johnson | 137—375 |
| 3,152,624 | 10/1964 | Ridley | 251—177 X |

FOREIGN PATENTS

| | | |
|---|---|---|
| 67,022 | 2/1940 | Czechoslovakia. |
| 728,133 | 4/1932 | France. |
| 140,646 | 9/1961 | U.S.S.R. |

ISADOR WEIL, *Primary Examiner.*

M. CARY NELSON, *Examiner.*